US012706865B2

(12) United States Patent
Liao et al.

(10) Patent No.: US 12,706,865 B2
(45) Date of Patent: Aug. 11, 2026

(54) PERFORMANCE ISOLATION METHOD FOR SEND QUEUE OF RDMA NETWORK INTERFACE CARD AND RDMA NETWORK INTERFACE CARD

(71) Applicant: YUSUR Technology Co., Ltd., Beijing (CN)

(72) Inventors: Yunkun Liao, Beijing (CN); Shuai Jiang, Beijing (CN)

(73) Assignee: YUSUR Technology Co., Ltd., Beijing (CN)

(*) Notice: Subject to any disclaimer, the term of this patent is extended or adjusted under 35 U.S.C. 154(b) by 286 days.

(21) Appl. No.: 18/648,380

(22) Filed: Apr. 28, 2024

(65) Prior Publication Data

US 2025/0007862 A1 Jan. 2, 2025

(30) Foreign Application Priority Data

Jun. 27, 2023 (CN) ........................ 202310762123.8

(51) Int. Cl.
*H04L 49/90* (2022.01)
*H04L 47/62* (2022.01)
*H04L 47/625* (2022.01)

(52) U.S. Cl.
CPC .......... *H04L 49/90* (2013.01); *H04L 47/6225* (2013.01); *H04L 47/626* (2013.01)

(58) Field of Classification Search
None
See application file for complete search history.

(56) References Cited

U.S. PATENT DOCUMENTS 11,409,685 B1 * 8/2022 Kaplan .................... G06F 13/28
2006/0230119 A1 * 10/2006 Hausauer ............ H04L 47/6265
709/216

(Continued)

FOREIGN PATENT DOCUMENTS

CN 101834787 A 9/2010
CN 109905329 A 6/2019

(Continued)

OTHER PUBLICATIONS

Liao Yunkun et al:"Optimize the TX Architecture of RDMA NC for Performance Isolation in the Cloud Environment" Proceedings of the Great Lakes Sympsium on VLSI 2023 , ACMPUB27 , New York, NY , USA, Jun. 5, 2023 (Jun. 5, 2023) , pp. 29-35, XP059399409.

(Continued)

*Primary Examiner* — Nguyen H Ngo
(74) *Attorney, Agent, or Firm* — Bayramoglu Law Offices LLC

(57) ABSTRACT

The present disclosure provides a performance isolation method for a send queue of an RDMA network interface card and an RDMA network interface card. The method includes: buffering, by an RDMA network interface card on a sending side, an identified WQE of a latency-sensitive tenant and an identified WQE of a bandwidth-sensitive tenant into a latency-sensitive group and a bandwidth-sensitive group in a buffering module, respectively; determining, by using an inter-group scheduler, whether to schedule a WQE in a latency-sensitive group or a WQE in a bandwidth-sensitive group; requesting, by a first scheduler, to schedule a latency-sensitive WQE in the latency-sensitive group by using a first scheduling algorithm; scheduling, by a second scheduler, a bandwidth-sensitive WQE in a wait station by using a second scheduling algorithm; transmitting, by the inter-group scheduler, a WQE scheduling result (Continued)

to a WQE processing module on the RDMA network interface card on the sending side.

11 Claims, 10 Drawing Sheets

(56) References Cited

U.S. PATENT DOCUMENTS

| | | | | |
|---|---|---|---|---|
| 2016/0294926 | A1* | 10/2016 | Zur | H04L 69/30 |
| 2017/0075591 | A1 | 3/2017 | Espeseth et al. | |
| 2023/0388371 | A1* | 11/2023 | Cheng | G06F 13/1631 |

FOREIGN PATENT DOCUMENTS

| | | | |
|---|---|---|---|
| CN | 114124830 | A | 3/2022 |
| CN | 114666281 | A | 6/2022 |

OTHER PUBLICATIONS

Yiwen Zhang et al: “Justitia: Software Multi-Tenancy in Hardware Kernel-Bypass Networks” USENIX , USENIX , The Advanced Computing Systems Association, Apr. 4, 2022(Apr. 4, 2022) , pp. 1-20,XP061071340, Retrieved from the Internet:URL:http://www.usenix.org/system/files/nsdi22spring_prepub_zhang-yiwen.pdf [retrieved on Apr. 4, 2022].

* cited by examiner

PERFORMANCE ISOLATION METHOD FOR SEND QUEUE OF RDMA NETWORK INTERFACE CARD AND RDMA NETWORK INTERFACE CARD

CROSS REFERENCE TO RELATED APPLICATIONS

The present disclosure claims priority to Chinese Application No. 202310762123.8 filed on Jun. 27, 2023 and entitled "PERFORMANCE ISOLATION METHOD FOR SEND QUEUE OF RDMA NETWORK INTERFACE CARD AND RDMA NETWORK INTERFACE CARD," all of which is incorporated herein by reference in its entirety.

TECHNICAL FIELD

The present disclosure relates to the field of RDMA network interface card sending end performance improvement technologies, and in particular, to a performance isolation method for a send queue of an RDMA network interface card and an RDMA network interface card.

BACKGROUND

A remote direct memory access (RDMA) technology is a high-performance network technology. An RDMA network interface card (RDMA NIC) designed based on the RDMA technology implements a zero-copy network transmission service bypassing an operating system kernel through a hardware-offloaded network protocol transport layer, thereby effectively reducing an occupation rate of a server CPU during network data transmission. In the RDMA technology, a queue (Queue) is used as an interface for software and hardware interaction. Designed queue include a send queue (SQ), a receive queue (RQ), and a completion queue (CQ). SQ and RQ form a queue pair (QP) in a paired manner, a basic component of SQ and RQ is a work queue element (WQE), and each WQE of SQ represents an RDMA data transmission request. The WQE may be considered as a "task description", and a data transmission request is sent by software to hardware. The task description includes a task that the software expects the hardware to do and detailed information about the task. FIG. 2 is a schematic diagram of an application of an RDMA network interface card in a multi-application scenario of cloud computing in the conventional technology. Both an RDMA network interface card of a cloud computing initiator and an RDMA network interface card of a cloud computing responder may execute a plurality of applications APPI, . . . , and APPN. A structure of the RDMA network interface card of the initiator corresponds to that of the RDMA network interface card of the responder. An SQ is stored in a buffer block (Memory) of the RDMA network interface card of the initiator. The SQ includes a WQE. Different applications put a WQE of which content needs to be sent into the SQ. Correspondingly, an RQ is stored in a buffer block (Memory) of the RDMA network interface card of the responder. The RQ also includes a WQE. An RDMA network interface card sending side (sending module) invokes and processes a WQE in a plurality of manners, to complete a corresponding sending task from an upper-layer application. In a cloud computing scenario, different applications may be of different types. Specifically, application types are mainly classified into two types: a latency-sensitive type and a bandwidth-sensitive type. Applications of different types may be simultaneously executed on a same RDMA network interface card. A message volume of a latency-sensitive application is usually small, and attention is paid to a completion latency of each request of the application. A message volume of a bandwidth-sensitive application is usually large, and attention is paid to a bandwidth that can be occupied by the application.

In a process of implementing the present disclosure, the inventors find that obvious performance interference exists when different types of applications, that is, a bandwidth-sensitive application and a latency-sensitive application, are executed on a same RDMA network interface card, and obvious performance interference also exists between bandwidth-sensitive applications.

An application executed on an RDMA network interface card is also referred to as a tenant (Tenant) of the RDMA network interface card. In a cloud computing scenario, how to improve the RDMA network interface card to resolve the obvious performance interference between the bandwidth-sensitive applications, and improve performance of different types of tenants when the tenants are simultaneously executed on a same RDMA network interface card is a problem to be resolved.

SUMMARY

In view of this, embodiments of the present disclosure provide a performance isolation method for a send queue of an RDMA network interface card and an RDMA network interface card, to eliminate or improve one or more defects in the conventional technology.

One aspect of the present disclosure provides a performance isolation method for a send queue of an RDMA network interface card. The method includes the following steps.

Identifying, by an RDMA network interface card on a sending side, a tenant type based on a tenant type identifier included in a queue pair identifier, buffering a work queue element WQE of a send queue of an identified latency-sensitive tenant as a latency-sensitive WQE into a latency-sensitive group of a buffering module, and buffering a WQE of a send queue of an identified bandwidth-sensitive tenant as a bandwidth-sensitive WQE into a bandwidth-sensitive group of the buffering module, where at least some of to-be-processed WQEs buffered into the bandwidth-sensitive group of the buffering module are stored into a wait station, WQEs of different tenants in the latency-sensitive group and the bandwidth-sensitive group that are included in the buffering module are buffered based on different queues, and each node of a queue is a WQE;

- determining, by using an inter-group scheduler, whether the WQE in the latency-sensitive group or the WQE in the bandwidth-sensitive group is scheduled, sending a scheduling request to a first scheduler when it is determined that the WQE in the latency-sensitive group is scheduled, and sending a scheduling request to a second scheduler when it is determined that the WQE in the bandwidth-sensitive group is scheduled;
- scheduling, by the first scheduler, the latency-sensitive WQE in the latency-sensitive group based on the scheduling request of the inter-group scheduler by using a first scheduling algorithm, and returning a WQE scheduling result to the inter-group scheduler;
- scheduling, by the second scheduler, the bandwidth-sensitive WQE in the wait station by using a second scheduling algorithm, and returning a WQE scheduling result to the inter-group scheduler;
- transmitting, by the inter-group scheduler, the WQE scheduling results from the first scheduler and the second scheduler to a WQE processing module on the RDMA network interface card on the sending side; and processing, by the WQE processing module, the latency-sensitive WQE based on the WQE scheduling result to output all data packets corresponding to the latency-sensitive WQE, and processing the bandwidth-sensitive WQE based on the WQE scheduling result to output, based on a path maximum transmission unit, one data packet corresponding to the bandwidth-sensitive WQE, and if there is a data packet that is not output for a WQE generated by a bandwidth-sensitive tenant, writing a WQE corresponding to the data packet that is not output back to the wait station.

In some embodiments of the present disclosure, the method further includes: receiving an identification request of a tenant through a driver interface on the RDMA network interface card, and providing, based on the identification request, a tenant identifier that includes a tenant type identifier to the tenant; and creating a queue pair having the queue pair identifier for each tenant allocated with the tenant identifier, and allocating a queue pair resource for storing a WQE to the queue pair, where the queue pair identifier includes the tenant type identifier.

In some embodiments of the present disclosure, the tenant type identifier is a binary value of a preset length, and the tenant type identifier is a last digit of the tenant identifier.

In some embodiments of the present disclosure, the first scheduling algorithm is a fair round robin scheduling algorithm, and the step of scheduling, by the first scheduler, the latency-sensitive WQE in the latency-sensitive group based on the scheduling request of the inter-group scheduler by using a first scheduling algorithm, and returning a WQE scheduling result to the inter-group scheduler includes: receiving, by the first scheduler, the scheduling request of the inter-group scheduler, and traversing, based on the fair round robin scheduling algorithm, a queue of latency-sensitive WQEs of different tenants in an active linked list maintained by the first scheduler, to poll the queue of latency-sensitive WQEs of the different tenants in the latency-sensitive group, where the active linked list is configured to record a queue number of to-be-processed latency-sensitive WQEs of the different tenants in the latency-sensitive group, and one node of the active inked list corresponds to one non-empty queue of latency-sensitive WQEs; and returning a WQE of a queue in a header of the active linked list as the WQE scheduling result to the inter-group scheduler, and deleting a corresponding node from the active linked list.

In some embodiments of the present disclosure, the second scheduling algorithm is a token bucket scheduling algorithm, and the step of scheduling, by the second scheduler, the bandwidth-sensitive WQE in the bandwidth-sensitive group of the wait station by using a second scheduling algorithm, and returning a WQE scheduling result to the inter-group scheduler includes: receiving, by the second scheduler, the scheduling request of the inter-group scheduler, and traversing, based on the token bucket scheduling algorithm, a token counter of a queue of bandwidth-sensitive WQEs of different tenants in an active linked list maintained by the second scheduler, to refresh a token and update a token counter count based on a predetermined refresh cycle and each token refresh quantity, where the active linked list is records a queue number of to-be-processed bandwidth-sensitive WQEs of the different tenants in the bandwidth-sensitive group, and a node of the active inked list corresponds to one non-empty queue of bandwidth-sensitive WQEs.

In some embodiments of the present disclosure, the method further includes: for the WQEs in the bandwidth-sensitive group in the wait station, maintaining states of all WQEs in the wait station by using a wait WQE state module, externally outputting all wait WQE states, and performing programming control on the WQE states based on set and reset interfaces provided by the wait WQE state module, where the wait WQE states include two states: an idle state and an occupied state.

In some embodiments of the present disclosure, the step of determining, by using an inter-group scheduler, whether the WQE in the latency-sensitive group or the WQE in the bandwidth-sensitive group is scheduled includes: determining, by the inter-group scheduler based on dynamic weights configured for the latency-sensitive group and the bandwidth-sensitive group, whether to schedule the WQE in the latency-sensitive group or the WQE in the bandwidth-sensitive group by using a weighted round robin scheduling algorithm, and updating the dynamic weights based on each scheduling result.

In some embodiments of the present disclosure, the updating the dynamic weights based on each scheduling result includes: reducing, based on each scheduling result, a weight of the latency-sensitive group or the bandwidth-sensitive group corresponding to the scheduling result.

Another aspect of the present disclosure provides an RDMA network interface card. The RDMA network interface card includes: a control module, configured to identify a tenant type based on a tenant type identifier included in a queue pair identifier, buffer a work queue element WQE of a send queue of an identified latency-sensitive tenant as a latency-sensitive WQE into a latency-sensitive group of a buffering module, and buffer a WQE of a send queue of an identified bandwidth-sensitive tenant as a bandwidth-sensitive WQE into a bandwidth-sensitive group of the buffering module, where at least some of to-be-processed WQEs buffered into the bandwidth-sensitive group of the buffering module are stored into a wait station, WQEs of different tenants in the latency-sensitive group and the bandwidth-sensitive group that are included in the buffering module are buffered based on different queues, and each node of a queue is a WQE; the wait station, configured to record at least some of to-be-processed WQEs in the bandwidth-sensitive group; an inter-group scheduler, configured to determine whether the WQE in the latency-sensitive group or the WQE in the bandwidth-sensitive group is scheduled, send a scheduling request to a first scheduler when it is determined that the WQE in the latency-sensitive group is scheduled, send a scheduling request to a second scheduler when it is determined that the WQE in the bandwidth-sensitive group is scheduled, and transmit WQE scheduling results from the first scheduler and the second scheduler to a WQE processing module; the first scheduler, configured to schedule the latency-sensitive WQE in the latency-sensitive group based on the scheduling request of the inter-group scheduler by using a first scheduling algorithm, and return a WQE scheduling result to the inter-group scheduler; the second scheduler, configured to schedule the bandwidth-sensitive WQE in the bandwidth-sensitive group in the wait station by using a second scheduling algorithm, and return a WQE scheduling result to the inter-group scheduler; and the WQE processing module, configured to process the latency-sensitive WQE based on the WQE scheduling result to output all data packets corresponding to the latency-sensitive WQE, and process the bandwidth-sensitive WQE based on the WQE scheduling result to output, based on a path maximum transmission unit, one data packet corresponding to the bandwidth-sensitive WQE, and if there is a data packet that is not output, write a WQE corresponding to the data packet that is not output back to the wait station.

In some embodiments of the present disclosure, the wait station includes: a true dual-port SRAM, including a first wait WQE read/write channel and a second wait WQE read/write channel, where the first wait WQE read/write channel is configured to transmit the bandwidth-sensitive WQE in the bandwidth-sensitive group in the buffering module to the wait station, and the second wait WQE read/write channel is configured to write the WQE corresponding to the data packet that is not output back to the wait station; a wait WQE state module, configured to maintain states of all WQEs in the wait station and externally output all wait WQE states; and set and reset interfaces, configured to perform programming control on the WQE states, where the wait WQE states include two states: an idle state and an occupied state.

In some embodiments of the present disclosure, the first scheduling algorithm is a fair round robin scheduling algorithm;

the second scheduling algorithm is a token bucket scheduling algorithm; and the inter-group scheduler determines, based on dynamic weights configured for the latency-sensitive group and the bandwidth-sensitive group, whether to schedule the WQE in the latency-sensitive group or the WQE in the bandwidth-sensitive group by using a weighted round robin scheduling algorithm, and updates the dynamic weights based on each scheduling result.

According to the performance isolation method for a send queue of an RDMA network interface card, provided in the present disclosure, WQEs from a latency-sensitive tenant and a bandwidth-sensitive tenant are separately stored, scheduled, and processed, to implement performance isolation between a latency-sensitive application and a bandwidth-sensitive application on an RDMA network interface card sending side. In addition, the WQE of the bandwidth-sensitive tenant is designed to be written back into the wait station for rescheduling if the WQE is incompletely transmitted through one transmission, thereby effectively avoiding long-term occupation of a bandwidth resource on a sending side by one WQE, and implementing performance isolation between bandwidth-sensitive applications. The RDMA network interface card provided in the present disclosure can resolve a problem of clear performance interference between bandwidth-sensitive applications by improving performance isolation, thereby improving performance of different types of tenants when the tenants are simultaneously executed on a same RDMA network interface card.

Additional advantages, objectives, and features of the present disclosure will be described in part in the following description, and will become partially apparent to those of ordinary skill in the art after they study the following, or may be learned based on the practice of the present disclosure. The objectives and other advantages of the present disclosure may be realized and obtained by a structure specified in the specification and the accompanying drawings.

Persons skilled in the art will understand that the objectives and advantages that can be achieved by using the present disclosure are not limited to the foregoing specific descriptions, and the foregoing and other objectives that can be achieved by the present disclosure will be more clearly understood according to the following detailed descriptions.

BRIEF DESCRIPTION OF THE DRAWINGS

The accompanying drawings described herein provide further understanding of the present disclosure, constitute a part of this application, and constitute no limitation on the present disclosure.

DETAILED DESCRIPTION

Figure 1:
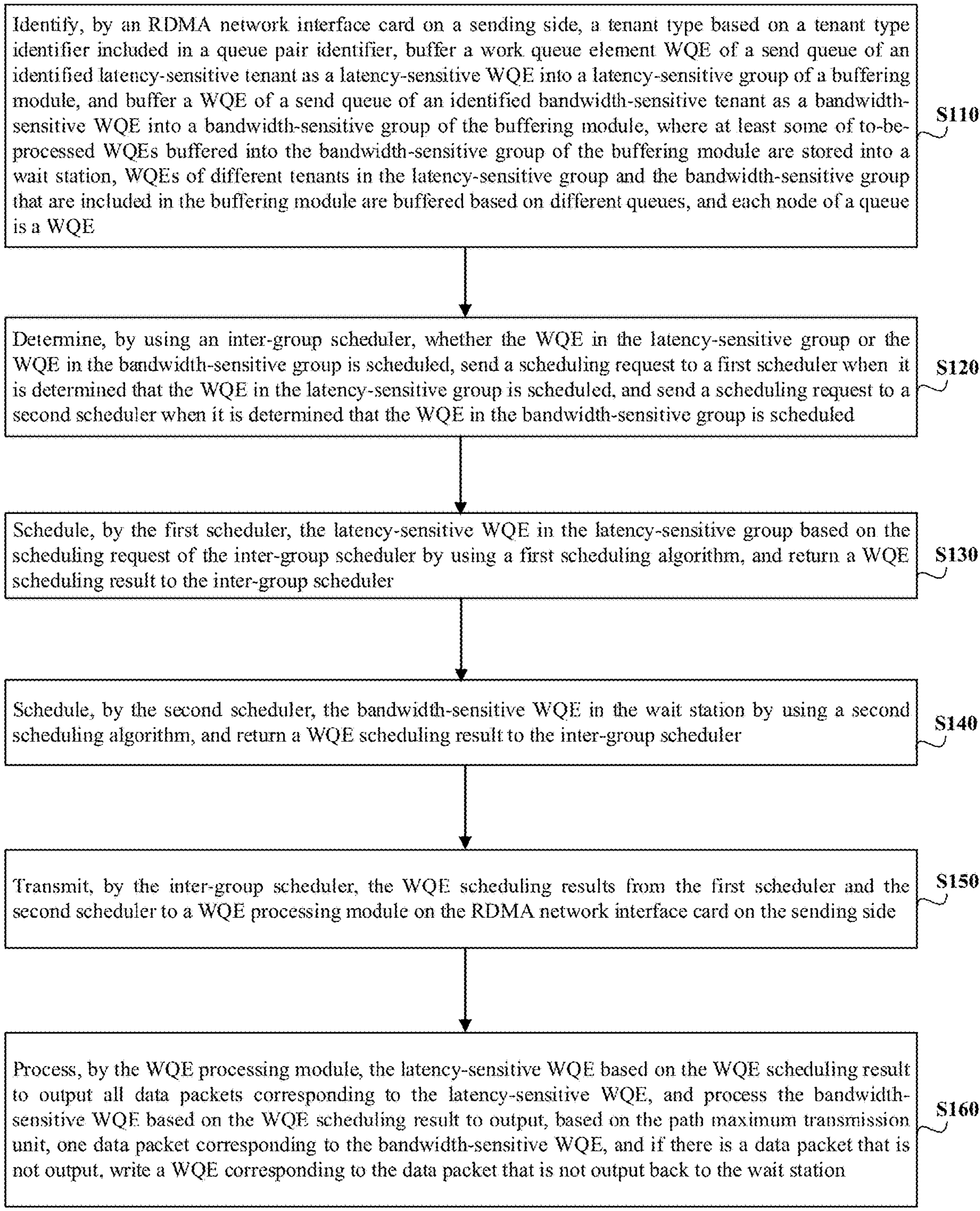
FIG. 1 is a flowchart of a performance isolation method for a send queue of an RDMA network interface card according to an embodiment of the present disclosure.
Figure 2:
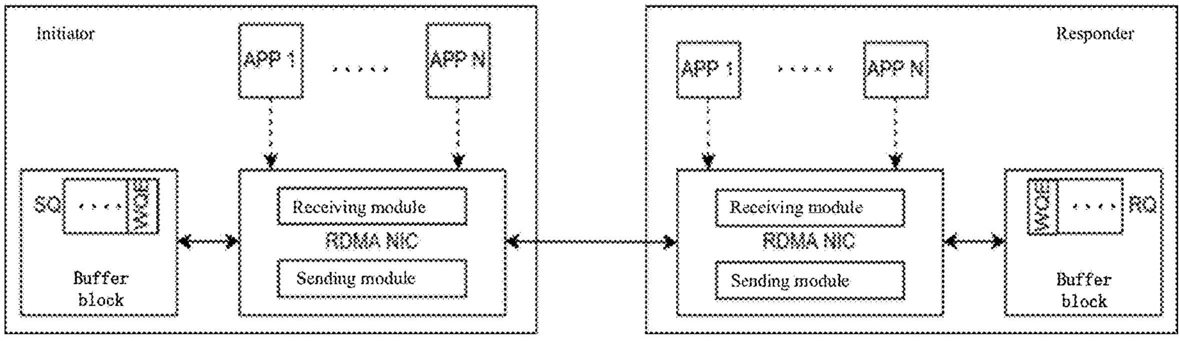
FIG. 2 is a schematic diagram of an application of an RDMA network interface card in a multi-application scenario in the conventional technology.

To make the objectives, technical solutions, and advantages of the present disclosure clearer, the following further describes the present disclosure in detail with reference to implementations and the accompanying drawings. Herein, a schematic implementation of the present disclosure and descriptions thereof are used to explain the present disclosure, but are not intended to limit the present disclosure.

It should be further noted herein that, in order to avoid blurring the present disclosure due to unnecessary details, only structures and/or processing steps closely related to the solutions according to the present disclosure are shown in the accompanying drawings, and other details that have little relationship with the present disclosure are omitted.

It should be emphasized that the term "comprise/include" when used herein refers to the presence of a feature, an element, a step, or a component, but does not rule out the presence or addition of one or more other features, elements, steps or components.

Obvious performance interference exists when different types of applications (such as a bandwidth-sensitive application and a latency-sensitive application) are executed on a same RDMA network interface card, and obvious performance interference also exists between bandwidth-sensitive applications. The inventors choose an existing RDMA network interface card with a bandwidth of 100 Gbps to perform experimental evaluation, and a latency-sensitive application and a bandwidth-sensitive analog application are simultaneously run on the experimental RDMA network interface card. An experimental result shows that when the latency-sensitive application is executed simultaneously with the bandwidth-sensitive application, the 50th percentile latency and 99th percentile latency of the latency-sensitive application increase by a factor of five compared to when the latency-sensitive application runs independently. Meanwhile, the inventors simultaneously run two bandwidth-sensitive analog applications on the RDMA network interface card. An experimental result shows that as a bandwidth occupied by one of the bandwidth-sensitive applications increases, a bandwidth of the other bandwidth-sensitive application decreases, that is, obvious performance interference exists between the two bandwidth-sensitive applications, and a sending side bandwidth resource of the RDMA network interface card cannot be shared fairly.

Therefore, to overcome the foregoing performance interference and ensure low latency and high bandwidth performance of the RDMA, the present disclosure provides a performance isolation method for a send queue of an RDMA network interface card, to implement performance isolation between a latency-sensitive application and a bandwidth-sensitive application and between bandwidth-sensitive applications in cloud computing. In embodiments of the present disclosure, performance isolation between applications is implemented by optimizing a sending side structure of the RDMA network interface card.

In the present disclosure, improvements on the sending side structure of the RDMA network interface card are as follows:

(1) A mechanism for classifying queue pairs is provided, to mark and classify send queues.

(2) A WQE buffer mechanism is designed to differentiate between different applications (or different types of applications).

(3) Different scheduling mechanisms are provided based on characteristics of WQEs of different types of applications. In an example, fair round robin-based scheduling and token bucket-based scheduling (two intra-group scheduling methods) are provided, and configurable weighted round robin inter-group scheduling (one inter-group scheduling method) that implements differentiated services for different types of applications is provided.

(4) Optionally, in some embodiments of the present disclosure, a method for performing fragmentation processing on a WQE is further provided, to prevent a WQE of a bandwidth-sensitive application from occupying a resource of a WQE processing module for a long time.

(5) Optionally, in some embodiments of the present disclosure, a differentiated service is further designed for an RDMA-based latency-sensitive application and an RDMA-based bandwidth-sensitive application, which is implemented by configuring dynamic weights.

FIG. 1 is a flowchart of a performance isolation method for a send queue of an RDMA network interface card according to the present disclosure. The method includes the following steps.

Step S110: Identify, by an RDMA network interface card on a sending side, a tenant type based on a tenant type identifier included in a queue pair identifier, buffer a work queue element WQE of a send queue of an identified latency-sensitive tenant as a latency-sensitive WQE into a latency-sensitive group of a buffering module, and buffer a WQE of a send queue of an identified bandwidth-sensitive tenant as a bandwidth-sensitive WQE into a bandwidth-sensitive group of the buffering module, where at least some of to-be-processed WQEs buffered into the bandwidth-sensitive group of the buffering module are stored into a wait station, WQEs of different tenants in the latency-sensitive group and the bandwidth-sensitive group that are included in the buffering module are buffered based on different queues, and each node of a queue is a WQE.

In the present disclosure, an application that is to be run on an RDMA network interface card (or an application that is to be executed on the RDMA network interface card) is used as a tenant (Tenant) of the RDMA network interface card. To execute each application on the RDMA network interface card, first, a queue pair (QP) needs to be created by using a driver, and accordingly, a queue pair (a send queue and a receive queue) resource is applied for. In this embodiment of the present disclosure, before each tenant that arrives at the RDMA network interface card for the first time creates a queue pair resource for storing a WQE on the RDMA network interface card, the tenant first applies for a tenant identifier (Tenant ID, or referred to as a tenant identification) through a driver interface (such as a request_tenant driver interface) on the RDMA network interface card, and an RDMA network interface card driver registered with a computer operating system allocates the tenant identifier to the tenant that arrives at the RDMA network interface card for the first time. The tenant identifier includes a tenant type identifier, a queue pair resource used to store a WQE is created for each tenant that is allocated with a tenant identifier, and the tenants are classified into a latency-sensitive tenant and a bandwidth-sensitive tenant based on tenant type identifiers. A process of allocating a tenant type identifier is: receiving, by a first driver interface located on the RDMA network interface card, a request of a tenant for applying for a tenant type identifier, allocating, by a control module on the RDMA network interface card, the tenant type identifier to the tenant, and storing all tenants and tenant type identifiers corresponding to all the tenants.

Step S120: Determine, by using an inter-group scheduler, whether the WQE in the latency-sensitive group or the WQE in the bandwidth-sensitive group is scheduled, sending a scheduling request to a first scheduler when it is determined that the WQE in the latency-sensitive group is scheduled, and send a scheduling request to a second scheduler when it is determined that the WQE in the bandwidth-sensitive group is scheduled. Optionally, the inter-group scheduler uses an inter-group weighted round robin scheduling algorithm or an inter-group fair round robin scheduling algorithm.

Step S130: Schedule, by the first scheduler, the latency-sensitive WQE in the latency-sensitive group based on the scheduling request of the inter-group scheduler by using a first scheduling algorithm, and return a WQE scheduling result to the inter-group scheduler. In an embodiment of the present disclosure, the first scheduling algorithm is the fair round robin scheduling algorithm.

Step S140: Schedule, by the second scheduler, the bandwidth-sensitive WQE in the wait station by using a second scheduling algorithm, and return a WQE scheduling result to the inter-group scheduler. In an embodiment of the present disclosure, the second scheduling algorithm is a token bucket scheduling algorithm.

Step S150: Transmit, by the inter-group scheduler, the WQE scheduling results from the first scheduler and the second scheduler to a WQE processing module on the RDMA network interface card on the sending side, where a preset quantity of data packets may be one or more, to interrupt a sending task of a bandwidth-sensitive tenant after a length of data is sent, thereby preventing a task from occupying a bandwidth resource on a sending side of the RDMA network interface card for a long time. A path maximum transmission unit (Maximum Transmission Unit, MTU) is a maximum data packet size that can be transmitted by a network in bytes, and is a parameter determined by a network device and a communication environment.

Step S160: Process, by the WQE processing module, the latency-sensitive WQE based on the WQE scheduling result to output all data packets corresponding to the latency-sensitive WQE, and processing the bandwidth-sensitive WQE based on the WQE scheduling result to output, based on the path maximum transmission unit, one data packet corresponding to the bandwidth-sensitive WQE, and if there is a data packet that is not output, write a WQE corresponding to the data packet that is not output back to the wait station.

Figure 3:
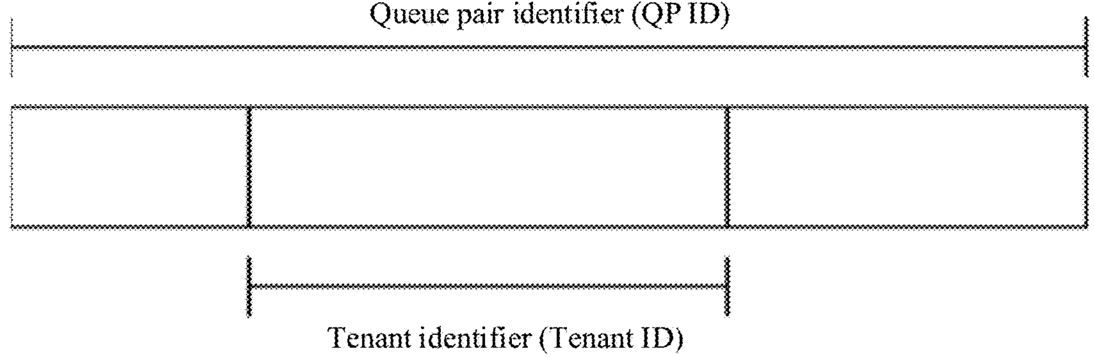
FIG. 3 is a schematic diagram of an encapsulation relationship between a tenant type identifier and a queue pair identifier according to an embodiment of the present disclosure.

Before the step S110, the method further includes: receiving, through the first driver interface on the RDMA network interface card, an identification request of a tenant that arrives at the RDMA network interface card for the first time, and providing a tenant identifier to the tenant based on the identification request, where the tenant identifier includes a tenant identifier that includes a tenant type identifier; and creating a queue pair having the queue pair identifier for each tenant allocated with a tenant identifier, and allocating the queue pair resource for storing a WQE to the queue pair, where the queue pair identifier includes the tenant type identifier. In the present disclosure, a method for classifying and marking a queue pair of the RDMA network interface card is used to distinguish between a queue pair used by the latency-sensitive application and a queue pair used by the bandwidth-sensitive application, to further differentially schedule send queues of different service types. In the present disclosure, an application that is to be run on the RDMA network interface card is used as a tenant (Tenant) of the RDMA network interface card. In an embodiment of the present disclosure, before a queue pair resource is created, an application on the RDMA network interface card may actively apply for a tenant type identifier (Tenant ID) by invoking a request_tenant driver interface provided in the present disclosure. The Tenant ID is a value of M digits, that is, a Tenant value range is 0 to 2 m. The last digit of the Tenant ID can be used to identify a type of a tenant. Specifically, the last digit of the Tenant ID is 0 to identify the latency-sensitive tenant, and the last digit of the Tenant ID is 1 to identify the bandwidth-sensitive tenant. In addition, in a specific embodiment of the present disclosure, in a callback function that provides create_qp to create a QP, a Tenant ID provided by an application is used as a part of a QP identifier (QP ID), as shown in FIG. 3. Optionally, the tenant type identifier (Tenant ID) is encapsulated in digits i to j of the queue pair identifier (QP ID), and a value relationship is $j-i=M-1$.

FIG. 3 is a schematic diagram of an encapsulation relationship between a tenant type identifier and a queue pair identifier according to an embodiment of the present disclosure. The tenant type identifier (Tenant ID) is encapsulated as a part of the queue pair identifier (QP ID). Optionally, in the present disclosure, a tenant type may be identified as a bandwidth-sensitive type or a latency-sensitive type based on the tenant type identifier encapsulated in the queue pair identifier. Further, a tenant (that is, an application) number is further encapsulated in the queue pair identifier. Based on this, a specific application from which a WQE corresponding to the queue pair identifier comes can be identified, and whether the WQE comes from a bandwidth-sensitive application or a latency-sensitive application can also be learned.

In the step S120, the step of determining, by using an inter-group scheduler, whether the WQE in the latency-sensitive group or the WQE in the bandwidth-sensitive group is scheduled includes: determining, by the inter-group scheduler based on dynamic weights configured for the latency-sensitive group and the bandwidth-sensitive group, whether to schedule the WQE in the latency-sensitive group or the WQE in the bandwidth-sensitive group by using a weighted round robin scheduling algorithm, and updating the dynamic weights based on each scheduling result. The updating the dynamic weights based on each scheduling result includes: reducing, based on each scheduling result, a weight of the latency-sensitive group or the bandwidth-sensitive group corresponding to the scheduling result. For dynamic weights respectively configured for the WQEs from the latency-sensitive group and the bandwidth-sensitive group, the dynamic weight of the WQE from the latency-sensitive group is positively correlated with a quantity of to-be-processed WQEs from a latency-sensitive tenant in a WQE buffering module, the dynamic weight of the WQE from the bandwidth-sensitive group is positively correlated with a quantity of to-be-processed WQEs from a bandwidth-sensitive tenant in the WQE buffering module, the dynamic weights of the WQEs from the latency-sensitive group and the bandwidth-sensitive group are initialized to equal values after being updated to 0 each time, the dynamic weight of the WQE from the latency-sensitive group is updated after each scheduling performed by using a fair round robin scheduler, and the dynamic weight of the WQE from the bandwidth-sensitive group is updated after each scheduling performed by using a token bucket scheduler.

In step S130, the step of scheduling, by the first scheduler, the latency-sensitive WQE in the latency-sensitive group based on the scheduling request of the inter-group scheduler by using a first scheduling algorithm, and returning a WQE scheduling result to the inter-group scheduler includes: receiving, by the first scheduler, the scheduling request of the inter-group scheduler, and traversing, based on the fair round robin scheduling algorithm, a queue of latency-sensitive WQEs of different tenants in an active linked list maintained by the first scheduler, to poll a queue of latency-sensitive WQEs of the different tenants in the latency-sensitive group, where the active linked list records a queue number of to-be-processed latency-sensitive WQEs of the different tenants in the latency-sensitive group, and one node of the active inked list corresponds to one non-empty queue of latency-sensitive WQEs; and returning a WQE of a queue in a header of the active linked list as the WQE scheduling result to the inter-group scheduler, and deleting a corresponding node from the active linked list. Optionally, a correspondence between a node in the active linked list and a queue may be implemented by storing a queue number, or may be implemented by storing a pointer that points to a queue head of a queue.

In step S140, the second scheduling algorithm is a token bucket scheduling algorithm, and the step of scheduling, by the second scheduler, the bandwidth-sensitive WQE in the bandwidth-sensitive group of the wait station by using a second scheduling algorithm, and returning a WQE scheduling result to the inter-group scheduler includes: receiving, by the second scheduler, the scheduling request of the inter-group scheduler, and traversing, based on the token bucket scheduling algorithm, a token counter of a queue of bandwidth-sensitive WQEs of different tenants in an active linked list maintained by the second scheduler, to refresh a token and update a token counter count based on a predetermined refresh cycle and each token refresh quantity, where the active linked list records a queue number of to-be-processed bandwidth-sensitive WQEs of the different tenants in the bandwidth-sensitive group, and a node of the active inked list corresponds to a non-empty queue of bandwidth-sensitive WQEs. For a WQE corresponding to a queue head of a traversed queue, if a token counter count is not less than a size of the path maximum transmission unit, the WQE is scheduled to the WQE processing module, and if the token counter count is less than the size of the path maximum transmission unit, a node of the corresponding WQE is moved to the tail of the queue. A counting update rule of the token counter is as follows: In a process in which a clock interrupt triggers sequential traversal of token counters in the active linked list, after each traversal, a token counter of a corresponding bandwidth-sensitive tenant is adjusted to a smaller value between a preset maximum value of the token counter and a sum of an original token counter and a quantity of refreshed tokens.

In an embodiment of the present disclosure, for the wait station, the method further includes: for the WQEs in the bandwidth-sensitive group in the wait station, maintaining states of all WQEs in the wait station by using a wait WQE state module, externally outputting all wait WQE states, and performing programming control on the WQE states based on set and reset interfaces provided by the wait WQE state module, where the wait WQE states include two states: an idle state and an occupied state. Set is a manner of externally forcing an input to be changed, to map the input to an output; and reset is to change an input value to an initial state during power-on by using a program. A PLC, namely, a programmable logic controller, which uses a type of programmable memory for internal storage of programs, executes user-oriented instructions such as instructions for logic operations, sequential control, timing, counting, and arithmetic operations, and controls various types of mechanical or production processes through digital or analog input/output. The purpose of this design is to implement a more logically clear and stepwise explicit organization in PLC programming by using instructions of set and reset operations.

Figure 4:
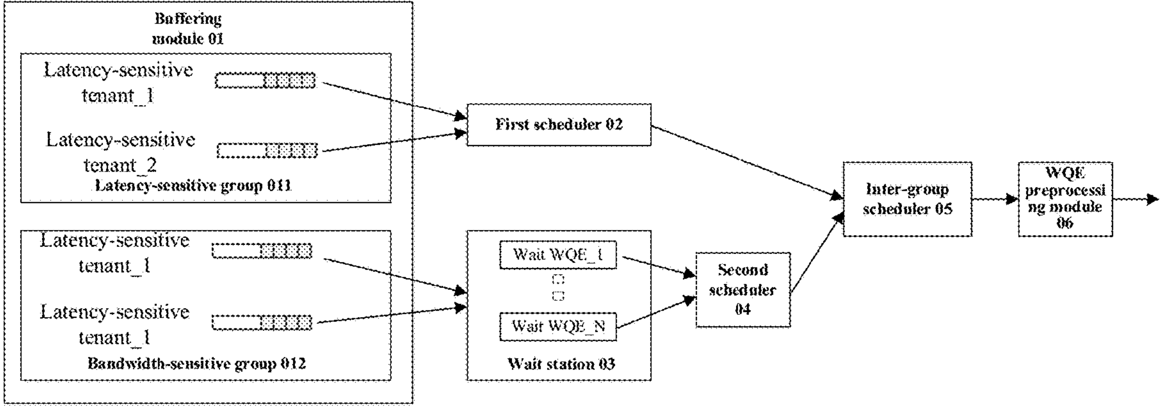
FIG. 4 is a schematic diagram of a structure of a sending side of an RDMA network interface card that supports performance isolation between a latency-sensitive application and a bandwidth-sensitive application according to an embodiment of the present disclosure.

The following describes a specific embodiment of the method provided in the present disclosure. First, a global technical solution is described by using FIG. 4. FIG. 4 shows a structure of a sending side of an RDMA network interface card that supports implementing performance isolation of send queue WQEs of a latency-sensitive application and a bandwidth-sensitive application. A WQE buffering module is configured to buffer WQEs of different tenants, thereby masking a reading latency of PCIe interface-based RDMA. Based on a tenant identifier on the RDMA network interface card, in the present disclosure, WQEs of a latency-sensitive tenant and a bandwidth-sensitive tenant are group-buffered, and are divided into a latency-sensitive group and a bandwidth-sensitive group. In the latency-sensitive group and the bandwidth-sensitive group, WQEs of different tenants are also stored separately. For the WQEs of different tenants of the latency-sensitive group, a fair round-robin scheduler is used. A wait station is configured to store the WQEs of different tenants of the bandwidth-sensitive group. For the WQEs in the wait station, a token bucket scheduler is used. An inter-group weighted round robin scheduler is used between the latency-sensitive group and the bandwidth-sensitive group. A WQE processing module implements processing of WQEs. Fragmentation scheduling is used in a processing process, and an unprocessed WQE is written to the wait station for subsequent scheduling.

FIG. 4 is a schematic diagram of a structure of a sending side of an RDMA network interface card that supports performance isolation between a latency-sensitive application and a bandwidth-sensitive application according to an embodiment of the present disclosure. A buffering module 01 stores a WQE from a bandwidth-sensitive tenant by using a bandwidth-sensitive group 012, stores a WQE from a latency-sensitive tenant by using a latency-sensitive group 011, and stores WQEs from different tenants by using queue classification within the bandwidth-sensitive group 012 and the latency-sensitive group 011. The WQE in the latency-sensitive group 011 is scheduled by using a first scheduler 02, the WQE in the bandwidth-sensitive group is first scheduled to a wait station 03 and then is scheduled by using a second scheduler 04, and the WQEs from the latency-sensitive group 011 and the bandwidth-sensitive group 012 are scheduled to a WQE processing module 06 by using an inter-group scheduler 05. The WQE processing module 06 completes processing of a scheduled WQE from the latency-sensitive group 011 at one time. However, if the processing of the WQE in the bandwidth-sensitive group 012 cannot be completed in a limited length, the WQE is written back to the wait station 03 to wait for scheduling and processing again.

Figure 5:
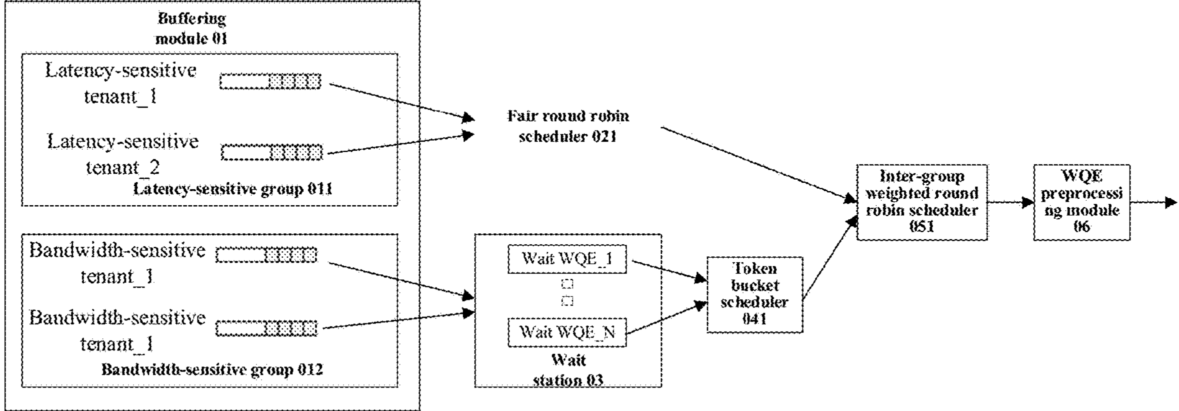
FIG. 5 is a schematic diagram of a structure of a sending side of an RDMA network interface card that supports performance isolation between a latency-sensitive application and a bandwidth-sensitive application according to a specific embodiment of the present disclosure.

FIG. 5 is a schematic diagram of a structure of a sending side of an RDMA network interface card that supports performance isolation between a latency-sensitive application and a bandwidth-sensitive application according to a specific embodiment of the present disclosure. A buffering module 01 stores a WQE from a bandwidth-sensitive tenant by using a bandwidth-sensitive group 012, stores a WQE from a latency-sensitive tenant by using a latency-sensitive group 011, and stores WQEs from different tenants by using queue classification within the bandwidth-sensitive group 012 and the latency-sensitive group 011. The WQE in the latency-sensitive group 011 is scheduled (based on a fair round robin algorithm) by using a fair round robin scheduler 021, the WQE in the bandwidth-sensitive group is first scheduled to a wait station 03 and then is scheduled (based on a token bucket scheduling algorithm) by using a token bucket scheduler 041, and the WQEs from the latency-sensitive group 011 and the bandwidth-sensitive group 012 are scheduled to a WQE processing module 06 by using an inter-group weighted round robin scheduler 051. The WQE processing module 06 completes processing of a scheduled WQE from the latency-sensitive group 011 at one time. However, if the processing of the WQE in the bandwidth-sensitive group 012 cannot be completed in a limited length, the WQE is written back to the wait station 03 to wait for scheduling and processing again.

Figure 6:
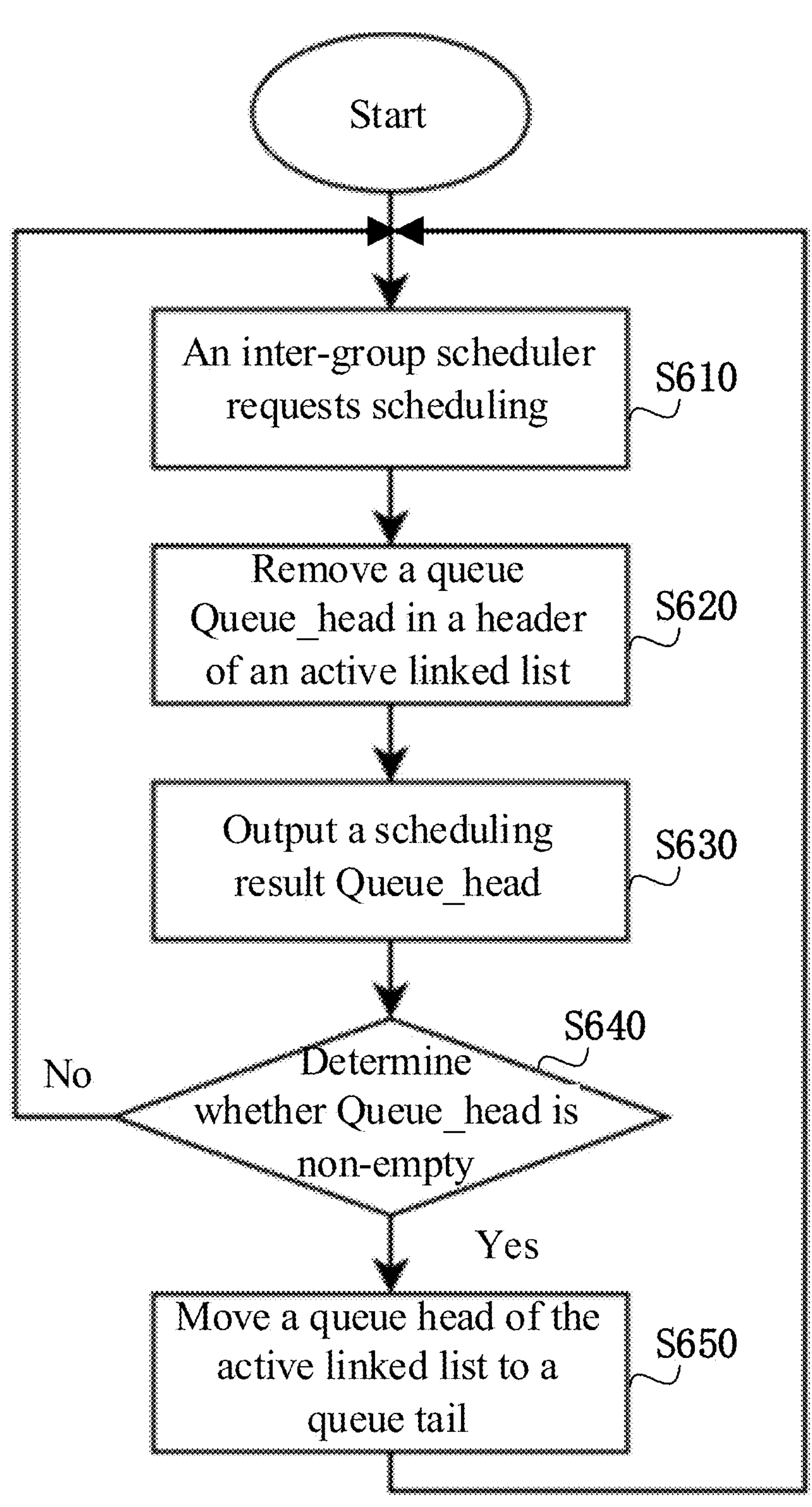
FIG. 6 is a flowchart of fair round robin scheduling processing in a latency-sensitive group according to an embodiment of the present disclosure.

FIG. 6 is a flowchart of fair round robin scheduling processing in a latency-sensitive group according to an embodiment of the present disclosure. In an embodiment of the present disclosure, a step of polling all queues in the latency-sensitive group by using a fair round robin scheduler includes: polling a queue head of a queue in the latency-sensitive group by periodically traversing an active linked list maintained by the fair round robin scheduler, where each node of the active linked list corresponds to one queue in the latency-sensitive group; and maintaining the active linked list by inserting a node of a queue with a to-be-processed WQE into the active linked list and deleting a node corresponding to a queue without a to-be-processed WQE from the active linked list. Specifically, in this embodiment of the present disclosure, a WQE of the latency-sensitive group is scheduled by using a fair round robin scheduling algorithm, to ensure that each WQE of the latency-sensitive tenant has an equal opportunity of being processed by a WQE processing module. In the present disclosure, during implementation of the fair round robin scheduling algorithm, an active linked list needs to be maintained. Elements in the active linked list (the linked list may be a single linked list, a doubly linked list, or a circular linked list) are numbers of WQE queues of different tenants in the latency-sensitive group, and the active linked list includes only an active queue number of a queue with a to-be-processed element. In particular, when a WQE is written into a buffer queue Q_i, if Q_i is in an empty state before the writing, a queue number of Q_i is inserted into the active linked list. FIG. 6 describes an execution procedure of the fair round robin scheduling algorithm used in the present disclosure, including the following steps.

Step S610: An inter-group scheduler requests scheduling.

Step S620: Remove a queue Queue_head in a header of the active linked list, where Queue_head is a scheduling result of this fair polling.

Step S630: Output the scheduling result Queue_head to a WQE processing module.

Step S640: After the scheduling result is output, determine whether Queue_head is empty, and if Queue_head is not empty, return to step S610.

Step S650: If Queue_head is empty, move a queue head of the active linked list to a queue tail, and return to step S610.

According to the present disclosure, in a design of the WQE processing module, a bandwidth-sensitive WQE slicing (and writing back) processing method is used, to avoid a bandwidth-sensitive WQE occupying the WQE processing module for a long time. The WQE slicing processing method provided in the present disclosure relates to two key elements, a wait station for storing a WQE in an executable state and a WQE processing module that supports WQE slicing.

Figure 7:
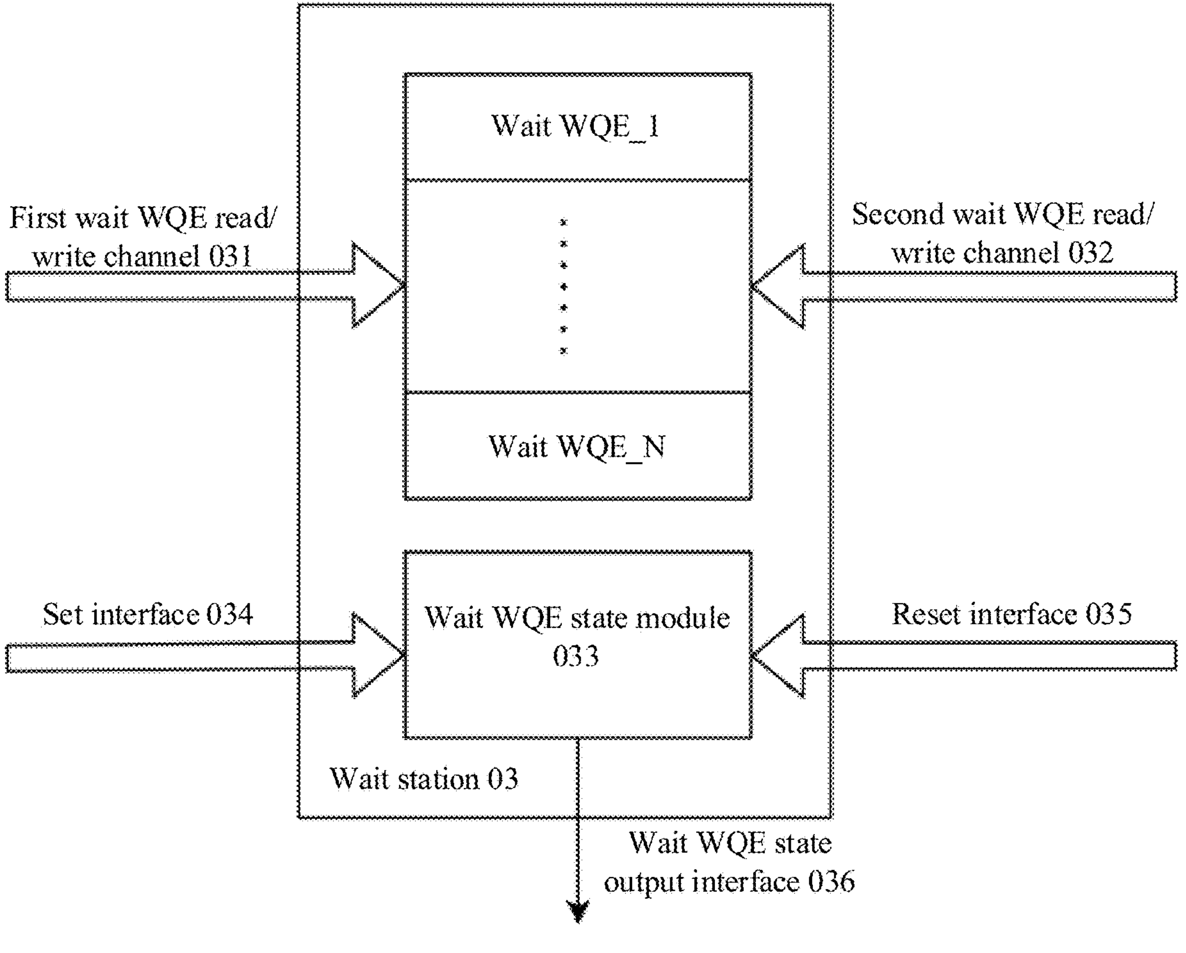
FIG. 7 is a schematic diagram of a structure of a wait station according to an embodiment of the present disclosure.

FIG. 7 is a schematic diagram of a structure of a wait station according to an embodiment of the present disclosure. The wait station uses a true dual-port SRAM (including a first wait WQE read/write channel 031 and a second wait WQE read/write channel 032) to implement storage of wait WQEs, and the two read/write channels (including the first wait WQE read/write channel 031 and a second wait WQE read/write channel 032) implement read/write of WQEs in bandwidth-sensitive groups in wait stations 03 at different positions, where the first wait WQE read/write channel 031 is configured to store a WQE from a buffering module to the wait station, and the second wait WQE read/write channel 032 is configured to return a WQE that is not completely processed by a processing module to the wait station. A wait WQE state module 033 maintains states of all the wait WQEs through a set interface 034 and a reset interface 035. The wait WQE states include two states: an idle state and an occupied state. The wait WQE state module further provides a wait WQE state output interface 036 for externally outputting all wait WQE states.

Figure 8:
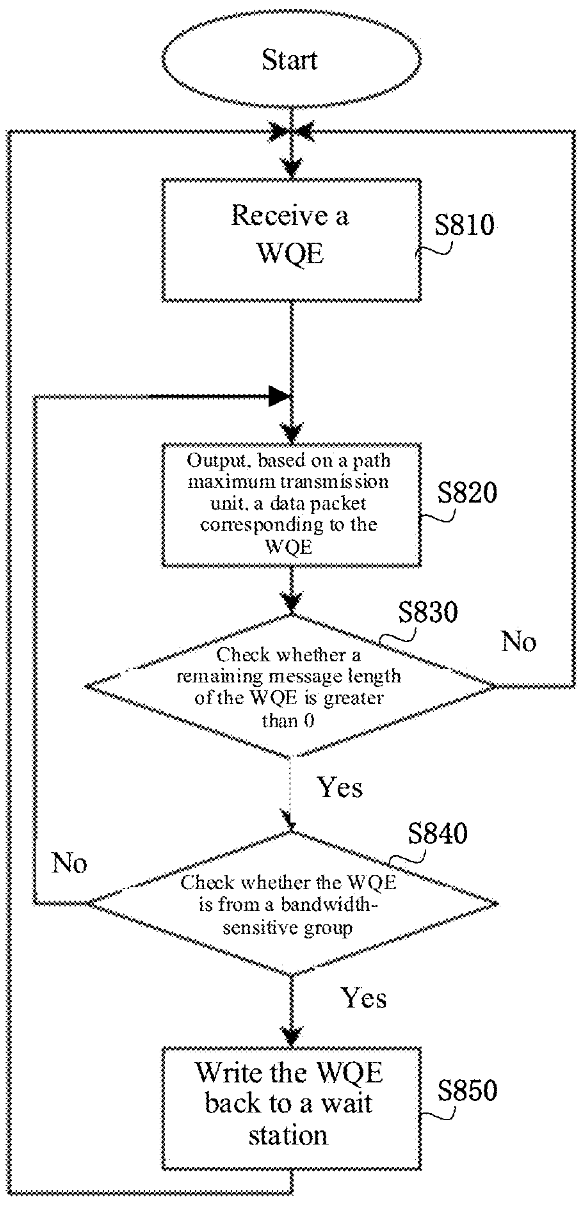
FIG. 8 is a flowchart of implementing WQE slicing by a WQE processing module according to an embodiment of the present disclosure.

FIG. 8 is a flowchart of implementing WQE slicing by a WQE processing module according to an embodiment of the present disclosure. Optionally, in the present disclosure, slicing processing may be performed on only a task corresponding to a WQE of a bandwidth-sensitive tenant. The flowchart includes the following steps.

Step S810: The WQE processing module receives a to-be-processed WQE.

Step S820: The WQE processing module outputs, based on a path maximum transmission unit (PMTU), a data packet corresponding to the WQE.

Step S830: After the data packet is output, check whether a remaining message length of the WQE is greater than 0, and if the remaining message length of the WQE is not greater than 0, return to step S810, and continue to prepare to receive a next to-be-processed WQE.

Step S840: If the remaining message length of the WQE is greater than 0, continue to check whether the WQE is from a bandwidth-sensitive group, and if the WQE is not from the bandwidth-sensitive group, return to step S820.

Step S850: If it is detected that the WQE is from the bandwidth-sensitive group, write an unprocessed WQE back to a wait station, and return to step S810.

Figure 9:
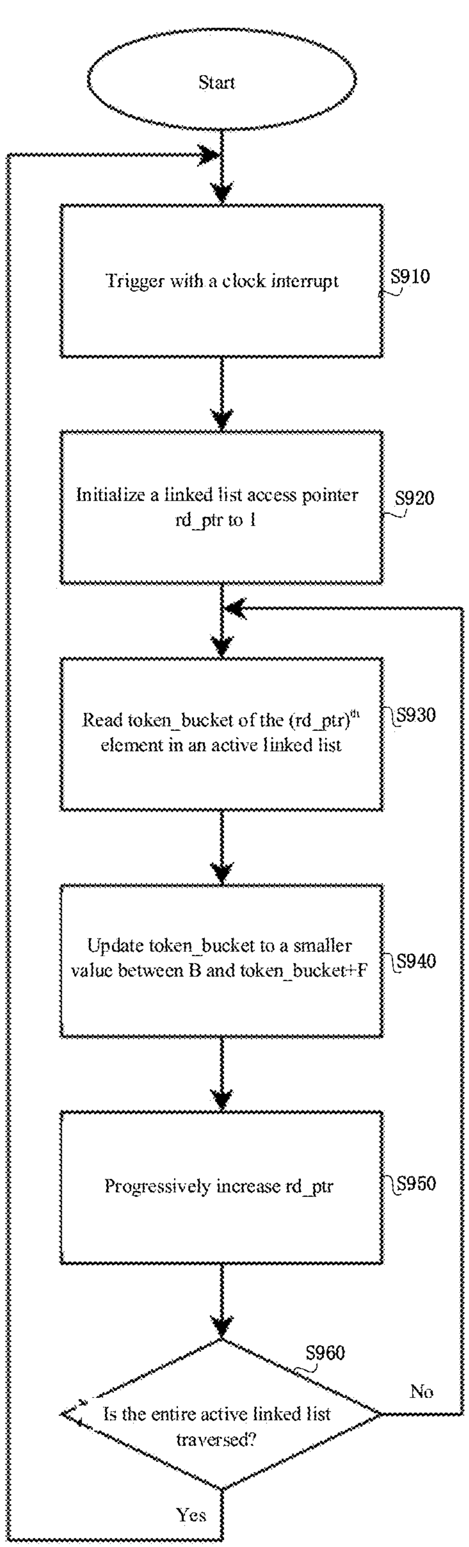
FIG. 9 is a flowchart of maintaining a token counter according to an embodiment of the present disclosure.

FIG. 9 is a flowchart of maintaining a token counter according to an embodiment of the present disclosure. Specifically, an update rule of the token counter is shown, including the following steps.

Step S910: Trigger with a clock interrupt (to sequentially traverse a token counter of an active linked list).

Step S920: Initialize a linked list access pointer rd_ptr to 1.

Step S930: Read token_bucket of the $(rd\_ptr)^{th}$ element in the active linked list.

Step S940: Update the token counter in a manner in which token_bucket=min (B, token_bucket+F), that is, update token_bucket to a smaller value between B and token_bucket+F.

Step S950: Progressively increase rd_ptr.

Step S960: Check whether the entire active linked list is traversed, if the entire active linked list is traversed, return to step S910, or if the entire active linked list is not traversed, return to step S930.

Figure 10:
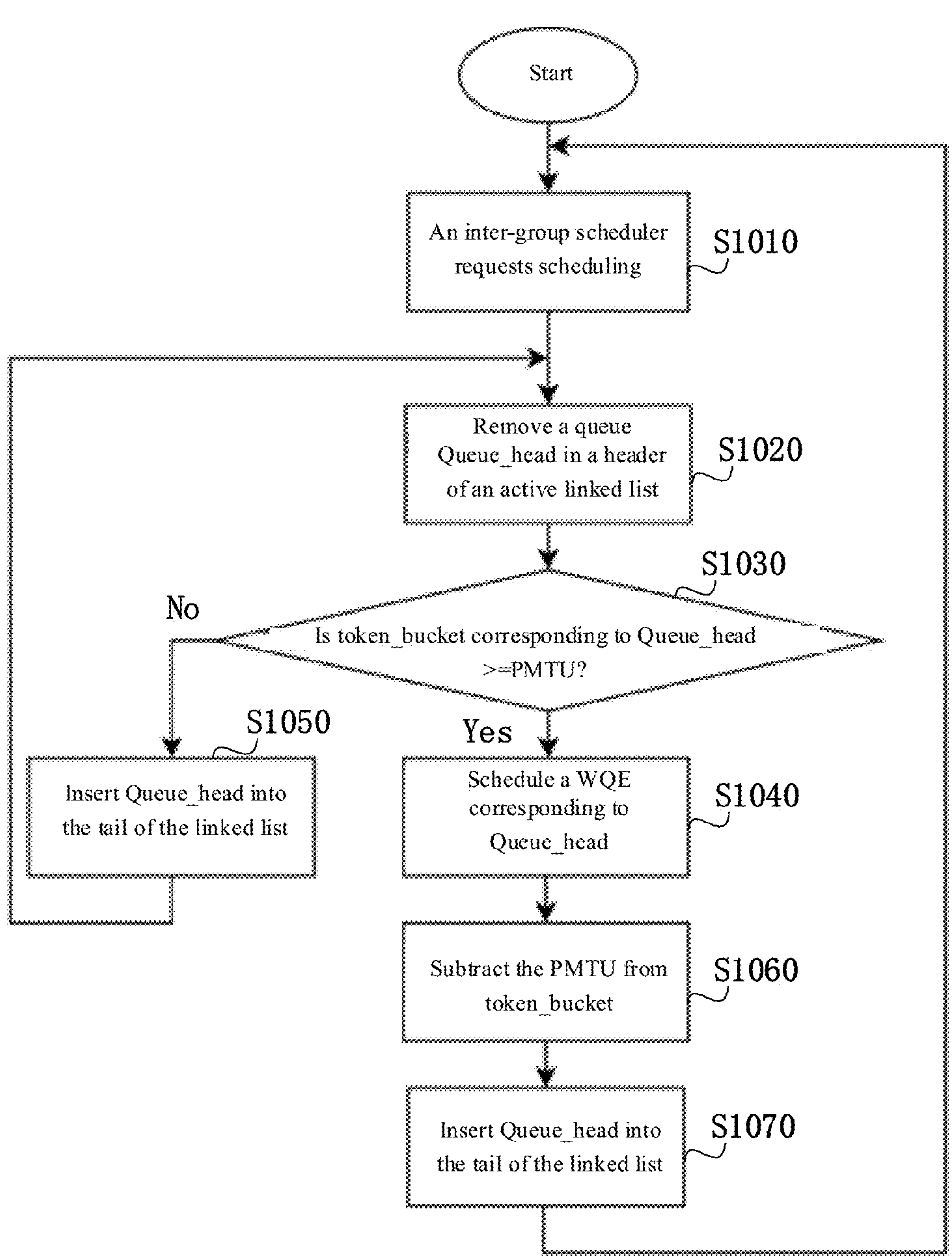
FIG. 10 is a procedure of executing bandwidth-sensitive WQE scheduling based on a token bucket algorithm according to an embodiment of the present disclosure.

FIG. 10 is a procedure of executing bandwidth-sensitive WQE scheduling based on a token bucket algorithm according to an embodiment of the present disclosure, including the following steps.

Step S1010: An inter-group scheduler requests scheduling.

Step S1020: Remove a queue Queue_head in a header of the active linked list.

Step S1030: Determine whether a token counter token_bucket corresponding to Queue_head is greater than a path maximum transmission unit (PMTU).

Step S1040: If the token counter token_bucket corresponding to Queue_head is greater than the path maximum transmission unit (PMTU), schedule a WQE corresponding to Queue_head.

Step S1050: If the token counter token_bucket corresponding to the Queue_head is not greater than the path maximum transmission unit (PMTU), insert Queue_head into the tail of the linked list and return to step S1020.

Step S1060: Subtract the PMTU from token_bucket.

Step S1070: Insert Queue_head into the tail of the linked list and return to step S1010.

For step S140, in this embodiment of the present disclosure, the token bucket scheduling algorithm is used to schedule the bandwidth-sensitive WQE in the wait station, to achieve a performance isolation effect that active bandwidth-sensitive tenants fairly share an available bandwidth. In this embodiment of the present disclosure, a token counter token_bucket is maintained for each bandwidth-sensitive tenant, and a maximum value of the counter is B. In addition, a timer is maintained, and a refresh cycle of the timer is T. In some embodiments, when a quantity of tenants in an active bandwidth-sensitive group is NA, all bandwidth-sensitive tenants may obtain a bandwidth of BW, and each active bandwidth-sensitive tenant shall obtain a bandwidth of BW/NA. In this embodiment of the present disclosure, it is specified that a quantity of refreshed tokens in the token bucket algorithm is F. According to a principle of token bucket scheduling, BW/NA should be approximately equal to F/T. In the present disclosure, during implementation of the token bucket scheduling algorithm, an active linked list needs to be maintained. Elements in the active linked list are queue numbers of wait WQEs of different tenants in the bandwidth-sensitive group, and the active linked list includes only an active queue number when the WQEs are in a to-be-processed state. In particular, when a WQE whose bandwidth-sensitive queue number is Q_j is written to the wait station, Q_j is inserted into the active linked list. After processing of a WQE whose bandwidth-sensitive queue number is Q_k is finished, Q_k is deleted from the active linked list.

Figure 11:
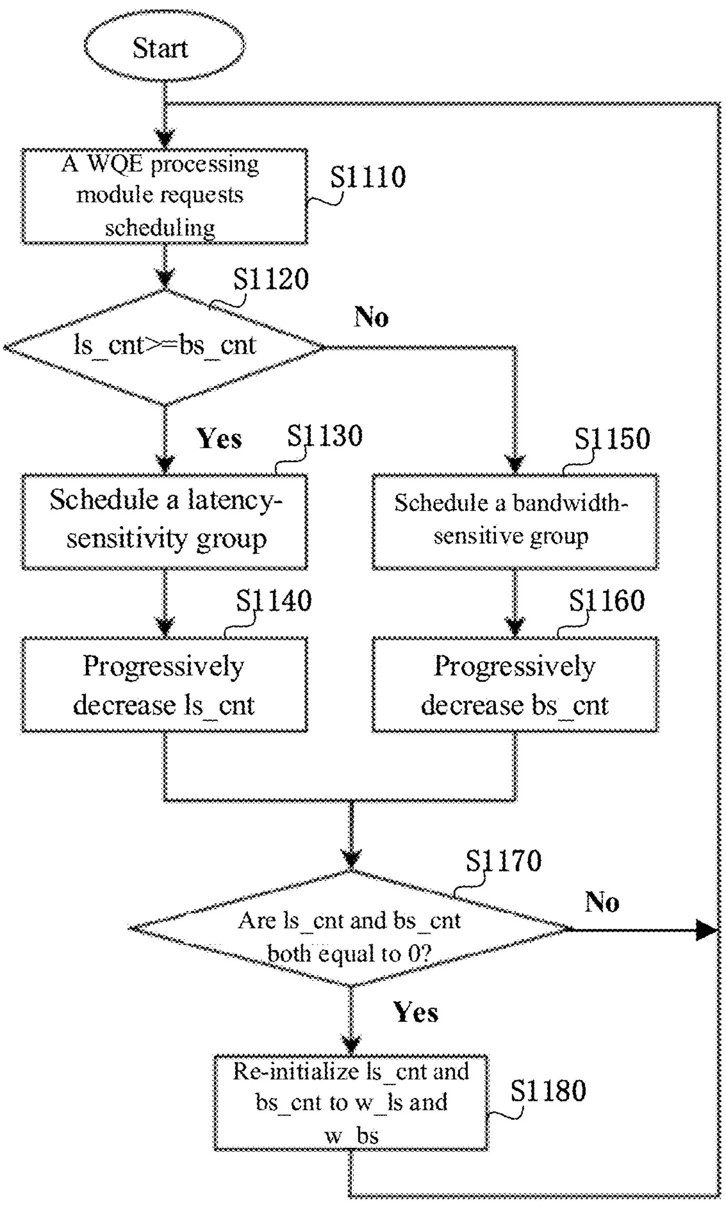
FIG. 11 is a weighted round robin scheduling process according to an embodiment of the present disclosure.

FIG. 11 is a weighted round robin scheduling process according to an embodiment of the present disclosure. In the present disclosure, a weighted round robin manner is used to schedule the WQEs of the latency-sensitive group and the bandwidth-sensitive group, and two groups of weights are configurable, thereby improving flexibility of differentiated services. Two groups of configurable dynamic weights are maintained for a weight w_ls of the latency-sensitive group and a weight w_bs of the bandwidth-sensitive group, and w_ls=w_bs=1 by default. In addition, in the present disclosure, two groups of dynamic weights need to be maintained, for ls_cnt of the latency-sensitive group and bs_cnt for of the bandwidth-sensitive group. For the dynamic weights, ls_cnt and bs_cnt are initially configured to same parameters, and the weight value ls_cnt or bs_cnt of a corresponding category is progressively decreased for each scheduled WQE. As shown in FIG. 11, the weighted round robin scheduling process includes the following steps.

Step S1110: A WQE processing module requests scheduling.

Step S1120: Determine whether ls_cnt is greater than or equal to bs_cnt, and if ls_cnt is greater than or equal to bs_cnt, perform step S1130 and step S1140 successively, or if ls_cnt is not greater than or equal to bs_cnt, perform step S1150 and step S1160 successively.

Step S1130: Schedule the latency-sensitivity group.

Step S1140: Progressively decrease ls_cnt, and perform step S1170.

Step S1150: Schedule the bandwidth-sensitive group.

Step S1160: Progressively decrease bs_cnt, and perform step S1170.

Step S1170: Determine whether ls_cnt and bs_cnt are both equal to 0, and if ls_cnt and bs_cnt are not both equal to 0, return step S1110, or if ls_cnt and bs_cnt are both equal to 0, perform step S1180.

Step S1180: Re-initialize ls_cnt and bs_cnt to w_ls and w_bs.

Further, in another embodiment of the present disclosure, to enable two RDMA network interface cards to implement efficient dual-redundancy backup, it is imperative to ensure that the two network cards have same physical addresses and same IP addresses. In this way, for an upper-layer application system, a "single network interface card" feature is presented in the system. On the contrary, when one network interface card is switched to another network interface card in the system for operating, the system cannot receive and send data normally if the IP address is changed. If the IP address is not changed but the physical address is changed, a change may occur in an ARP binding table in a protocol stack, and the switching time between the two network interface cards will be prolonged by reestablishing a relationship between the IP address in the ARP binding table and the physical address of the network interface card. However, the physical address of each network interface card is unique in the world and is stored in a PROM of the network interface card. To enable the two network interface cards to have same physical addresses, during initialization of the network interface cards, the physical address of one of the network interface cards is read from the PROM, and content of the physical address is written into a physical address register and a data structure variable of the other network interface card. In this case, the two network interface cards have completely same physical addresses. Based on this design, the present disclosure can implement switching between two network interface cards.

Figure 12:
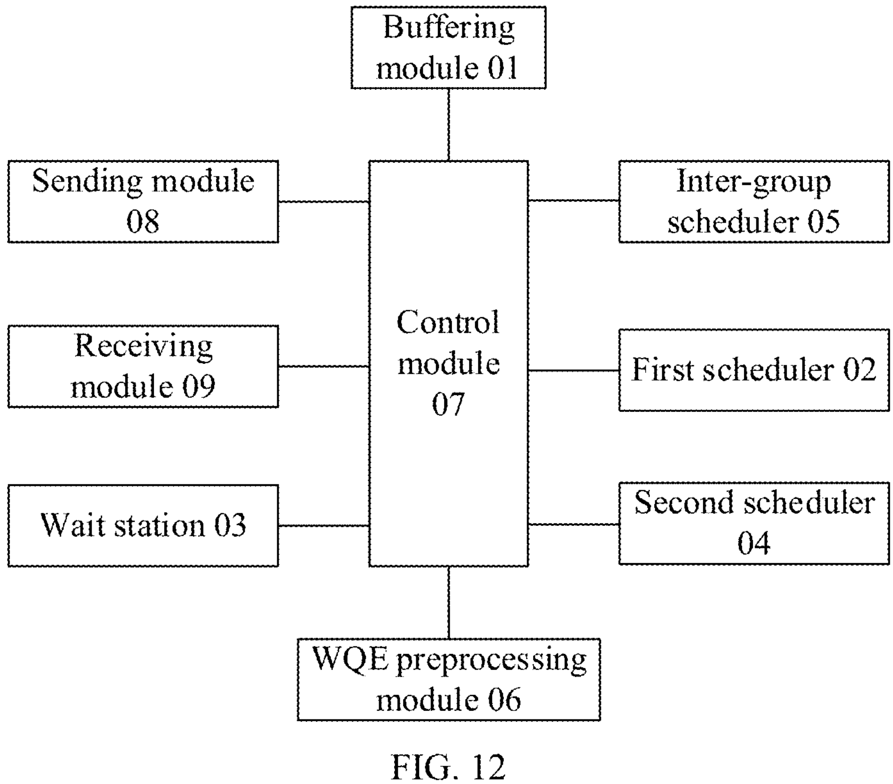
FIG. 12 is a schematic diagram of a structure of an RDMA network interface card according to an embodiment of the present disclosure.

Another aspect of the present disclosure provides an RDMA network interface card. FIG. 12 is a schematic diagram of a structure of an RDMA network interface card according to an embodiment of the present disclosure. The RDMA network interface card includes a buffering module 01, a first scheduler 02, a wait station 03, a second scheduler 04, an inter-group scheduler 05, a WQE processing module 06, a control module 07, a sending module 08, and a receiving module 09.

The control module 07 is configured to identify a tenant type based on a tenant type identifier included in a queue pair identifier, buffer a work queue element WQE of a send queue of an identified latency-sensitive tenant as a latency-sensitive WQE into a latency-sensitive group of the buffering module 01, and buffer a WQE of a send queue of an identified bandwidth-sensitive tenant as a bandwidth-sensitive WQE into a bandwidth-sensitive group of the buffering module 01, where at least some of to-be-processed WQEs buffered into the bandwidth-sensitive group of the buffering module 01 are stored into the wait station 03, WQEs of different tenants in the latency-sensitive group and the bandwidth-sensitive group that are included in the buffering module are buffered based on different queues, and each node of a queue is a WQE.

The wait station 03 is configured to record at least some of to-be-processed WQEs in the bandwidth-sensitive group. For details of a structure of the wait station 03, refer to FIG. 7, and the structure includes a true dual-port SRAM, a wait WQE state module 033, a set interface 034, and a reset interface 035. The true dual-port SRAM includes a first wait WQE read/write channel 031 and a second wait WQE read/write channel 032. The first wait WQE read/write channel 031 is configured to transmit the bandwidth-sensitive WQE in the bandwidth-sensitive group in the buffering module to the wait station, and the second wait WQE read/write channel 032 is configured to write a WQE corresponding to a data packet that is not output back to the wait station. The wait WQE state module 033 is configured to maintain states of all WQEs in the wait station and externally output all wait WQE states.

The set interface 034 and the reset interface 035 are configured to perform programming control on the WQE states, where the wait WQE states include two states: an idle state and an occupied state.

The inter-group scheduler 05 is configured to determine whether the WQE in the latency-sensitive group or the WQE in the bandwidth-sensitive group is scheduled, send a scheduling request to a first scheduler when it is determined that the WQE in the latency-sensitive group is scheduled, send a scheduling request to a second scheduler when it is determined that the WQE in the bandwidth-sensitive group is scheduled, and transmit WQE scheduling results from the first scheduler 02 and the second scheduler 04 to the WQE processing module.

The first scheduler 05 is configured to schedule the latency-sensitive WQE in the latency-sensitive group based on the scheduling request of the inter-group scheduler by using a first scheduling algorithm, and return a WQE scheduling result to the inter-group scheduler 05.

The second scheduler 04 is configured to schedule the bandwidth-sensitive WQE in the bandwidth-sensitive group in the wait station 03 by using a second scheduling algorithm, and return a WQE scheduling result to the inter-group scheduler 05.

The WQE processing module 06 is configured to process the latency-sensitive WQE based on the WQE scheduling result to output all data packets corresponding to the latency-sensitive WQE, and process the bandwidth-sensitive WQE based on the WQE scheduling result to output, based on a path maximum transmission unit, one data packet corresponding to the bandwidth-sensitive WQE, and if there is a data packet that is not output, write a WQE corresponding to the data packet that is not output back to the wait station.

The control module 07 is configured to identify a tenant type based on a tenant type identifier included in a queue pair identifier, buffer a work queue element WQE of a send queue of an identified latency-sensitive tenant as a latency-sensitive WQE into a latency-sensitive group of the buffering module, and buffer a WQE of a send queue of an identified bandwidth-sensitive tenant as a bandwidth-sensitive WQE into a bandwidth-sensitive group of the buffering module, where at least some of to-be-processed WQEs buffered into the bandwidth-sensitive group of the buffering module are stored into the wait station, WQEs of different tenants in the latency-sensitive group and the bandwidth-sensitive group that are included in the buffering module are buffered based on different queues, and each node of a queue is a WQE.

The sending module 08 is a conventional configuration of the RDMA network interface card, and is configured to send data corresponding to a WQE.

The receiving module 09 is a conventional configuration of the RDMA network interface card, and is configured to receive data from another network interface card.

Correspondingly to the foregoing method, the present disclosure further provides a performance isolation system for a send queue of an RDMA network interface card. The system includes a computer device, the computer device includes a processor and a memory, the memory stores computer instructions, the processor is configured to execute the computer instructions stored in the memory, and when the computer instructions are executed by the processor, the system implements the steps of the foregoing method.

An embodiment of the present disclosure further provides a computer-readable storage medium, on which a computer program is stored. The computer program is executed by a processor to implement the steps of the foregoing method. The computer-readable storage medium may be a tangible storage medium, such as a random access memory (RAM), a memory, a read-only memory (ROM), an electrically programmable ROM, an electrically erasable programmable ROM, a register, a floppy disk, a hard disk, a removable storage disk, a CD-ROM, or any other form of storage medium known in the art.

Compared with the conventional technology, the performance isolation method and system for a send queue of an RDMA network interface card, and the storage medium that are provided in the present disclosure have the following advantages:

(1) WQEs from a latency-sensitive tenant and a bandwidth-sensitive tenant are separately stored, scheduled, and processed, to implement performance isolation between a latency-sensitive application and a bandwidth-sensitive application on the sending side of the RDMA network interface card.

(2) A manner of writing a WQE back into the wait station and rescheduling the WQE if the WQE is incompletely transmitted through one transmission is designed for the WQE of the bandwidth-sensitive tenant, to ensure that an RDMA-based bandwidth-sensitive application can fairly obtain a bandwidth resource on the sending side, thereby effectively avoiding long-term occupation of the bandwidth resource on the sending side by one WQE of the bandwidth-sensitive application, avoiding long-term occupation of a WQE processing module resource by the WQE of the bandwidth-sensitive application, and implementing performance isolation between bandwidth-sensitive applications.

(3) A fair round robin scheduler is used on the sending side of the RDMA network interface card to schedule a corresponding WQE, to ensure that the latency-sensitive application can fairly obtain an opportunity of being processed by the WQE processing module.

Persons of ordinary skill in the art may understand that the exemplary components, systems, and methods described with reference to the embodiments disclosed herein may be implemented with hardware, software, or a combination of hardware and software. Specifically, whether the exemplary components, systems, and methods are implemented with hardware or software depends on particular application and design constraints of the technical solution. Persons skilled in the art may implement the described functions using different methods for each particular application, but such implementation should not be considered beyond the scope of the present disclosure. When the exemplary components, systems, and methods are implemented with hardware, the hardware may be, for example, an electronic circuit, an application-specific integrated circuit (ASIC), appropriate firmware, a plug-in, a function card, or the like. When the exemplary components, systems, and methods are implemented with software, an element in the present disclosure is a program or a code segment that is used to execute a required task. The program or the code segment may be stored in a machine-readable medium, or transmitted on a transmission medium or a communication link by using a data signal carried in a carrier.

It should be noted that the present disclosure is not limited to the specific configurations and processing described above and shown in the figures. For brevity, a detailed description of a known method is omitted herein. In the foregoing embodiments, several specific steps are described and illustrated as examples. However, the process of the method in the present disclosure is not limited to the described and shown specific steps. Person skilled in the art may make various changes, modifications, and additions, or change a sequence between the steps after understanding the spirit of the present disclosure.

In the present disclosure, features described and/or exemplified in one implementation may be used in one or more other implementations in a same manner or in a similar manner, and/or may be combined with or replace features of other implementations.

The foregoing descriptions are merely preferred embodiments of the present disclosure, and are not intended to limit the present disclosure. For persons skilled in the art, various modifications or changes may be made to the embodiments of the present disclosure. Any modification, equivalent replacement, improvement, and the like made in the spirit and principles of the present disclosure shall fall within the protection scope of the present disclosure.

What is claimed is:

1. A performance isolation method for a send queue of a remote direct memory access (RDMA) network interface card, comprising:

identifying, by the RDMA network interface card on a sending side, a tenant type based on a tenant type identifier comprised in a queue pair identifier, buffering a work queue element (WQE) of a send queue of an identified latency-sensitive tenant as a latency-sensitive WQE into a latency-sensitive group of a buffering module, and buffering a WQE of a send queue of an identified bandwidth-sensitive tenant as a bandwidth-sensitive WQE into a bandwidth-sensitive group of the buffering module, wherein at least some of to-be-processed WQEs buffered into the bandwidth-sensitive group of the buffering module are stored into a wait station, WQEs of different tenants in the latency-sensitive group and the bandwidth-sensitive group that are comprised in the buffering module are buffered based on different queues, and each node of a queue is a WQE;

determining, by using an inter-group scheduler, whether the WQE in the latency-sensitive group or the WQE in the bandwidth-sensitive group is scheduled, sending a scheduling request to a first scheduler when it is determined that the WQE in the latency-sensitive group is scheduled, and sending the scheduling request to a second scheduler when it is determined that the WQE in the bandwidth-sensitive group is scheduled;

scheduling, by the first scheduler, the latency-sensitive WQE in the latency-sensitive group based on the scheduling request of the inter-group scheduler by using a first scheduling algorithm, and returning a WQE scheduling result to the inter-group scheduler;

scheduling, by the second scheduler, the bandwidth-sensitive WQE in the wait station by using a second scheduling algorithm, and returning a WQE scheduling result to the inter-group scheduler;

transmitting, by the inter-group scheduler, the WQE scheduling results from the first scheduler and the second scheduler to a WQE processing module on the RDMA network interface card on the sending side; and processing, by the WQE processing module, the latency-sensitive WQE based on the WQE scheduling result to output all data packets corresponding to the latency-sensitive WQE, and processing the bandwidth-sensitive WQE based on the WQE scheduling result to output, based on a path maximum transmission unit, one data packet corresponding to the bandwidth-sensitive WQE, and if there is a data packet that is not output, writing a WQE corresponding to the data packet that is not output back to the wait station.

2. The method according to claim 1, wherein the method further comprises:

receiving an identification request of a tenant through a driver interface on the RDMA network interface card, and providing, based on the identification request, a tenant identifier that comprises a tenant type identifier to the tenant; and creating a queue pair having the queue pair identifier for each tenant allocated with the tenant identifier, and allocating a queue pair resource for storing a WQE to the queue pair, wherein the queue pair identifier comprises the tenant type identifier.

3. The method according to claim 2, wherein the tenant type identifier is a binary value of a preset length, and the tenant type identifier is a last digit of the tenant identifier.

4. The method according to claim 1, wherein the first scheduling algorithm is a fair round robin scheduling algorithm, and the scheduling, by the first scheduler, the latency-sensitive WQE in the latency-sensitive group based on the scheduling request of the inter-group scheduler by using the first scheduling algorithm, and returning the WQE scheduling result to the inter-group scheduler comprises:

receiving, by the first scheduler, the scheduling request of the inter-group scheduler, and traversing, based on the fair round robin scheduling algorithm, a queue of latency-sensitive WQEs of different tenants in an active linked list maintained by the first scheduler, to poll the queue of latency-sensitive WQEs of the different tenants in the latency-sensitive group, wherein the active linked list is configured to record a queue number of to-be-processed latency-sensitive WQEs of the different tenants in the latency-sensitive group, and one node of the active linked list corresponds to one non-empty queue of latency-sensitive WQEs; and returning a WQE of the polled queue in a header of the active linked list as the WQE scheduling result to the inter-group scheduler, and deleting a corresponding node from the active linked list.

5. The method according to claim 1, wherein the second scheduling algorithm is a token bucket scheduling algorithm, and the scheduling, by the second scheduler, the bandwidth-sensitive WQE in the bandwidth-sensitive group of the wait station by using the second scheduling algorithm, and returning the WQE scheduling result to the inter-group scheduler comprises:

receiving, by the second scheduler, the scheduling request of the inter-group scheduler, and traversing, based on the token bucket scheduling algorithm, a token counter of a queue of bandwidth-sensitive WQEs of different tenants in an active linked list maintained by the second scheduler, to refresh a token and update a token counter count based on a predetermined refresh cycle and each token refresh quantity, wherein the active linked list is configured to record a queue number of to-be-processed bandwidth-sensitive WQEs of the different tenants in the bandwidth-sensitive group, and one node of the active inked list corresponds to one non-empty queue of bandwidth-sensitive WQEs.

6. The method according to claim 1, wherein the method further comprises:

for the WQEs in the bandwidth-sensitive group in the wait station, maintaining states of all WQEs in the wait station by using a wait WQE state module, externally outputting all wait WQE states, and performing programming control on the WQE states based on set and reset interfaces provided by the wait WQE state module, wherein the wait WQE states comprise two states: an idle state and an occupied state.

7. The method according to claim 1, wherein the determining, by using the inter-group scheduler, whether the WQE in the latency-sensitive group or the WQE in the bandwidth-sensitive group is scheduled comprises:

determining, by the inter-group scheduler based on dynamic weights configured for the latency-sensitive group and the bandwidth-sensitive group, whether to schedule the WQE in the latency-sensitive group or the WQE in the bandwidth-sensitive group by using a weighted round robin scheduling algorithm, and updating the dynamic weights based on each scheduling result.

8. The method according to claim 7, wherein the updating the dynamic weights based on each scheduling result comprises reducing, based on each scheduling result, a weight of the latency-sensitive group or the bandwidth-sensitive group corresponding to the scheduling result.

9. A remote direct memory access (RDMA) network interface card, comprising:

a control module, configured to identify a tenant type based on a tenant type identifier comprised in a queue pair identifier, buffer a work queue element (WQE) of a send queue of an identified latency-sensitive tenant as a latency-sensitive WQE into a latency-sensitive group of a buffering module, and buffer a WQE of a send queue of an identified bandwidth-sensitive tenant as a bandwidth-sensitive WQE into a bandwidth-sensitive group of the buffering module, wherein at least some of to-be-processed WQEs buffered into the bandwidth-sensitive group of the buffering module are stored into a wait station, WQEs of different tenants in the latency-sensitive group and the bandwidth-sensitive group that are comprised in the buffering module are buffered based on different queues, and each node of a queue is a WQE;

the wait station, configured to record at least some of to-be-processed WQEs in the bandwidth-sensitive group;

an inter-group scheduler, configured to determine whether the WQE in the latency-sensitive group or the WQE in the bandwidth-sensitive group is scheduled, send a scheduling request to a first scheduler when it is determined that the WQE in the latency-sensitive group is scheduled, send a scheduling request to a second scheduler when it is determined that the WQE in the bandwidth-sensitive group is scheduled, and transmit WQE scheduling results from the first scheduler and the second scheduler to a WQE processing module;

the first scheduler, configured to schedule the latency-sensitive WQE in the latency-sensitive group based on the scheduling request of the inter-group scheduler by using a first scheduling algorithm, and return a WQE scheduling result to the inter-group scheduler;

the second scheduler, configured to schedule the bandwidth-sensitive WQE in the bandwidth-sensitive group in the wait station by using a second scheduling algorithm, and return the WQE scheduling result to the inter-group scheduler; and the WQE processing module, configured to process the latency-sensitive WQE based on the WQE scheduling result to output all data packets corresponding to the latency-sensitive WQE, and process the bandwidth-sensitive WQE based on the WQE scheduling result to output, based on a path maximum transmission unit, one data packet corresponding to the bandwidth-sensitive WQE, and if there is a data packet that is not output, write a WQE corresponding to the data packet that is not output back to the wait station.

10. The RDMA network interface card according to claim 9, wherein the wait station comprises:

a true dual-port static random-access memory (SRAM), comprising a first wait WQE read/write channel and a second wait WQE read/write channel, wherein the first wait WQE read/write channel is configured to transmit the bandwidth-sensitive WQE in the bandwidth-sensitive group in the buffering module to the wait station, and the second wait WQE read/write channel is configured to write the WQE corresponding to the data packet that is not output back to the wait station;

a wait WQE state module, configured to maintain states of all WQEs in the wait station and externally output all wait WQE states; and set and reset interfaces, configured to perform programming control on the WQE states, wherein the wait WQE states comprise two states: an idle state and an occupied state.

11. The RDMA network interface card according to claim 9, wherein the first scheduling algorithm is a fair round robin scheduling algorithm;

the second scheduling algorithm is a token bucket scheduling algorithm; and the inter-group scheduler is further configured to determine, based on dynamic weights configured for the latency-sensitive group and the bandwidth-sensitive group, whether to schedule the WQE in the latency-sensitive group or the WQE in the bandwidth-sensitive group by using a weighted round robin scheduling algorithm, and update the dynamic weights based on each scheduling result.

* * * * *